June 27, 1967 T. T. WILKINSON 3,327,592
OSCILLATORY ACTUATOR WITH SELF-SCAVENGING MEANS
Filed May 27, 1966 2 Sheets-Sheet 1
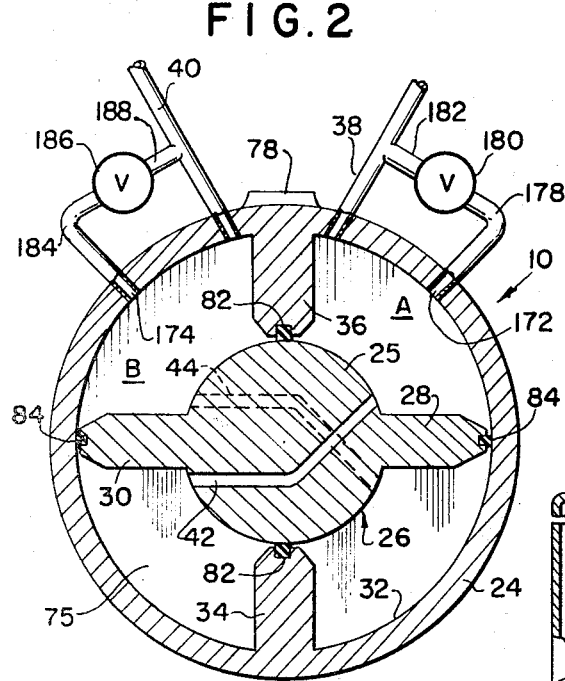
FIG. 2
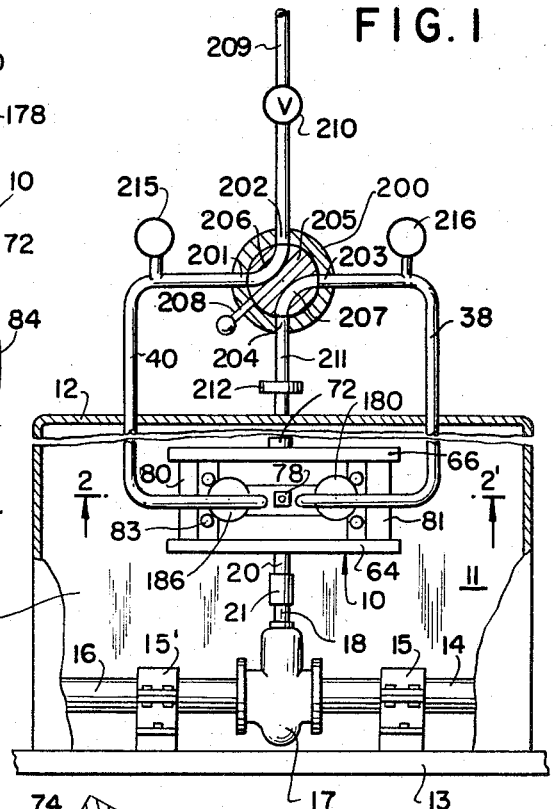
FIG. 1
FIG. 3
INVENTOR.
THURLAND THOMPSON WILKINSON
BY
McLean, Morton and Boustead
ATTORNEYS

INVENTOR.
THURLAND THOMPSON WILKINSON

United States Patent Office 3,327,592
Patented June 27, 1967

3,327,592
OSCILLATORY ACTUATOR WITH SELF-SCAVENGING MEANS
Thurland T. Wilkinson, Princeton, N.J., assignor, by mesne assignments, to Sinclair Research, Inc., New York, N.Y., a corporation of Delaware
Filed May 27, 1966, Ser. No. 553,441
1 Claim. (Cl. 92—122)

This in a continuation-in-part of application Ser. No. 183,320, filed Mar. 16, 1962 now Patent No. 3,253,515 which is in turn a continuation-in-part of application Ser. No. 117,912, filed June 19, 1961, now abandoned.

My invention relates to actuation of remotely located devices and in particular provides a fluid actuated motor.

In large oil tankers the piping to the various cargo tanks extends through such tanks. The valves provided to communicate the pumping systems with the individual tanks and the valves interconnecting the several pumping systems are frequently located near the bottom of the cargo tanks. Similarly, valves are also found near the bottom of the ballast tanks. In a typical 50,000 ton tanker 156 such submerged valves can be found.

Although some more recently commissioned tankers are provided with automatic valve control systems, in most cases the cargo and ballast valves are controlled from the deck by means of reach rods extending through the tanks in which the valves are located. Generally, automatic valve control has been avoided, partly at least for the reason that the location of the valves renders service of any automatic valve actuator difficult, and partly for the reason that, since the actuator must be submerged, relatively expensive equipment is required to avoid the possible accumulation of moisture, sludge and other foreign matter which might be forced into the actuator under the pressure head of the cargo or ballast above it.

It is thus a principal object of my invention to provide an automatic valve actuator suitable for use under submerged conditions.

It is also an object of my invention to provide such a valve actuator having relatively simple construction which can be inexpensively fabricated.

It is still another object of my invention to provide such a valve actuator which can be readily operated at the low air pressure of an ordinary deck compressed air supply on a tank vessel without the need for filtering or drying the air. It will be understood, however, that the valve actuator of my invention can also be used with relatively simple hydraulic systems, and can even be operated from one of the various water systems normally found on tank vessels.

It is a further object of my invention to provide such a valve actuator in which rather than avoiding the accumulation of moisture, sludge and other foreign matter, the valve actuator is provided with a self-scavenging arrangement. It will thus be apparent that in the valve actuator of my invention it is unnecessary to hold fluid pressure on the actuating system during periods in which it is inoperative.

Although the principal object of my invention is directed to submerged valve actuation, it will be seen from the description hereinafter that the device of my invention can be utilized other than under submerged conditions, for example on the deck of a tank vessel and in void spaces, and that it can be used for actuating devices other than valves.

Basically, the device of my invention is a double acting fluid motor in which a pressuring fluid can be admitted to either of two pairs of variable volume chambers having volume varying elements, i.e., driven members, which are connected to move in synchronism such that the maximum position of one pair of chambers occurs at the minimum of the other and vice versa. An exhaust port arrangement establishes communication with each pair of variable volume chambers at the maximum volume position thereof whereby fluid is allowed to flow through the motor purging its enclosed volume. Fluid conduit means are provided for transmitting the pressuring fluid to and from each of the pairs of variable volume chambers.

In one form of the invention, a mechanical linkage between the exhaust port arrangement and the driven members transmits the movement of the driven members to actuate a valve or the like. Thus at the end of each stroke, as the pressuring fluid drives the driven members to a position of maximum volume of the pair of chambers to which the fluid is admitted, the exhaust port in such pair of chambers opens establishing communication with the other pair of chambers and the fluid sweeps the interior of the motor clean, discharging through the fluid conduit attached to the other pair of chambers.

In the preferred embodiment of my invention the driven or movable members are in the form of a single hub or rotor mounted for oscillation upon a shaft and having two diametrically extending vanes. This rotor is positioned within a hollow body having an interior chamber of generally cylindrical shape which it divides into four variable volume subchambers. In this embodiment the ends of the vanes remote from the rotor are in fluid-tight sliding contact with the walls of the interior chamber while the rotor is itself in fluid-tight sliding contact with a pair of diametrically positioned, inwardly extending partitions attached to the walls of the interior chamber. Opposite pairs of subchambers are interconnected and cooperate under fluid pressure to exert a balanced torque on the rotor.

A fluid conduit is connected to each pair of subchambers and each is so positioned that it always communicates with one pair of subchambers even at the minimum position thereof. The exhaust port connection for each pair of subchambers is preferably associated with the fluid conduit to the other pair of subchambers in such a manner that it normally communicates with that other pair of subchambers but establishes communication with the first pair of subchambers at the maximum position thereof.

In another alternative construction of the motor of my invention, the exhaust port arrangement can be built into the vane separating adjacent subchambers, a normally closed valve being provided which is actuated by the inwardly extending portions of the chamber at the maximum positions of the subchambers.

While the pressuring fluid can be simply exhausted after purging the actuator, where the motor is to be operated under submerged conditions it is preferred to discharge the fluid through the conduit attached to the other pair of subchambers. The two fluid conduits required thus alternate in function as fluid supply and exhaust lines.

For a more complete understanding of the practical application of my invention reference is made to the appended drawings in which:

FIG. 1 is a somewhat schematic elevation of a valve control system utilizing the valve actuator of my invention;

FIG. 2 is an enlarged plan section of the valve actuator shown in FIG. 1, taken along line 2—2';

FIG. 3 is a perspective view partially cut away of the valve actuator shown in FIG. 1;

Figure 4:
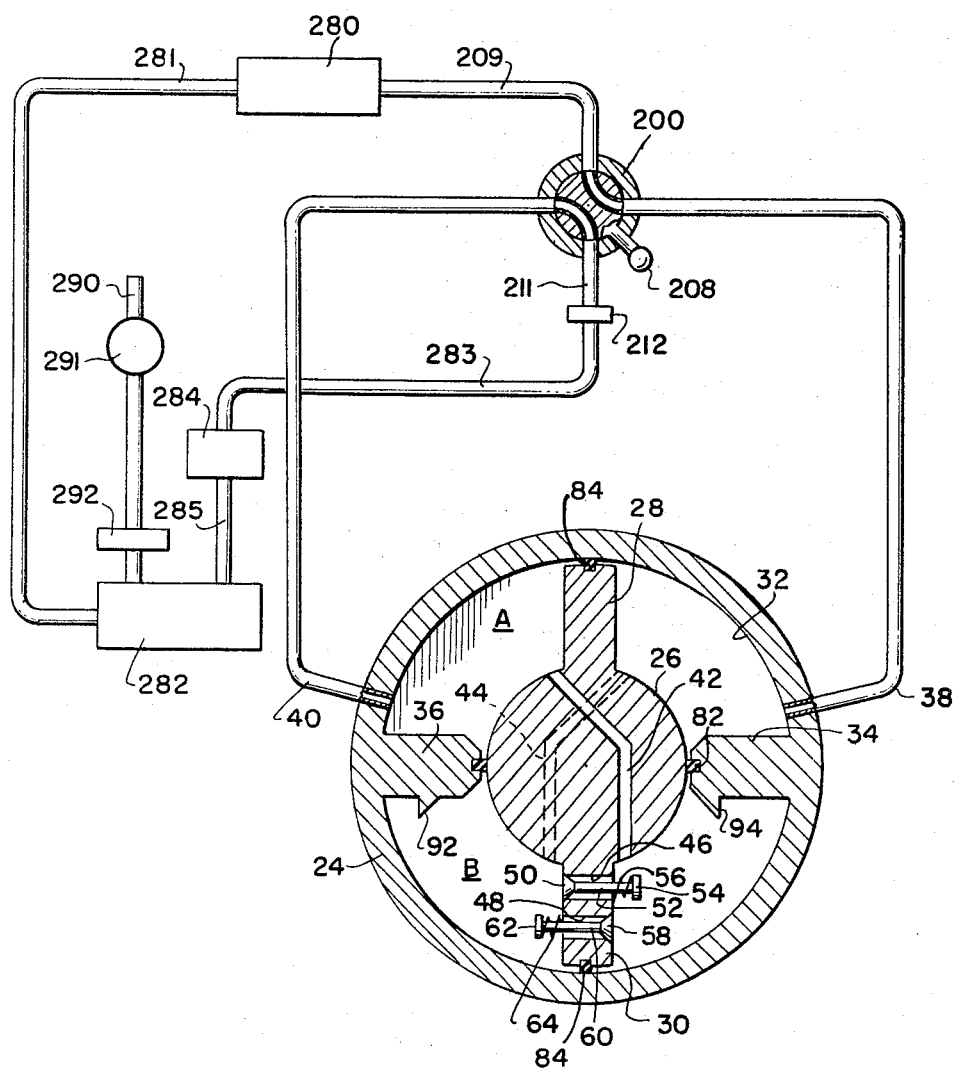
FIG. 4 is a sectional view of an alternate construction of the valve actuator of my invention shown in conjunction with a schematic diagram of a control system different from that shown in FIG. 1.

Referring now to FIG. 1, a valve actuator in accordance with my invention is designated by the reference number 10 and is installed in the cargo space 11 of a cargo tank in a tank vessel having a deck 12. At the bottom 13 of the tank enclosing cargo space 11, a pipe 14 is forming a part of the pumping system of the tank vessel is mounted in horizontal position supported by an upright bracket 15. Pipe 14 is connected to a second pipe 16, similarly supported by a bracket 15', through a valve 17 also located near the bottom 13 of the tank enclosing cargo space 11, and which valve is provided with an upright valve stem 18, which is rotatably operated through some angle less than 180° between fully open and fully closed positions. Actuator 10 is mounted on a portion of the rear wall 19 of the tank enclosing cargo space 11, and has its shaft 20 directly coupled through coupling 21 to the upper end of valve stem 18.

Referring more particularly to FIG. 2 valve actuator 10 is incorporated into a closed, cylindrical housing 24. Located centrally within housing 24 is a rotor 26 which is mounted to rotate its axis and having a central hub portion 25 which is provided along its length with diametrically opposite vanes 28 and 30 extending in sliding sealing contact with the inside surface of the cylindrical side wall 32 of housing 24; the axis of side wall 32 being coincident with the axis of rotor 26. Each vane 28, 30 is provided with a seal 84 extending about its periphery. Side wall 32 is provided with a pair of diametrically opposite, internal walls or shoes 34 and 36 extending across the chamber from wall 32 to rotor 26. The ends of shoes 34 and 36 remote from wall 32 are maintained in sliding, sealing contact with hub 25 by a seal 82 which extends along the edges of shoes 34 and 36. Thus, the annular chamber defined between wall 32 and rotor 26 is divided into two parts A and B such that vane 28 oscillates in part A of the annular chamber while vane 30 oscillates in part B of the annular chamber. Each of the chamber parts A and B is further partitioned into two variable volume subchambers by vanes 28 and 30.

Two fluid conduits 38 and 40 communicate with the interior of parts A and B of the chamber respectively through wall 32, one adjacent each side of shoe 36 and each being sufficiently close to shoe 36 that they are not overtravelled by vanes 28 and 30 as the latter oscillate. The subchambers within part A are interconnected with the subchambers within part B on opposite sides of vanes 28 and 30 by crossover ports 42 and 44 extending through hub 25. Thus, fluid communication is provided from conduit 38 through the subchamber of part A defined by vane 28 and shoe 36, and crossover port 42 to the subchamber of part B defined by vane 30 and shoe 34. Similarly, fluid communication is provided from conduit 40 through the subchamber of part B defined by vane 30 and shoe 36, and crossover port 44 to the subchamber of part A defined by vane 28 and shoe 34. With this arrangement fluid pressure introduced through conduits 38 and 40 can be exerted on the reverse sides of opposite vanes to turn the rotor with balanced torque in either direction.

In accordance with my invention the fluid motor of FIG. 2 is further provided with a port 172 in side wall 32 spaced a short distance from conduit 38 and communicating with chamber part A. A second port 174 is provided in side wall 32 spaced a short distance from conduit 40 and communicating with chamber part B. While the positions of conduits 38 and 40 are such that they enter side wall 32 within the clearances between shoe 36 and vanes 28 and 30 respectively, the positions of ports 172 and 174 are sufficiently removed from shoe 36 that they will be passed by vanes 28 and 30 respectively as the latter complete an oscillation toward shoe 36.

Port 172 is serially connected through a conduit 178, a pressure relief valve 180 and a conduit 182 to conduit 38. Similarly, port 174 is serially connected through a conduit 184, a pressure relief valve 186 and a conduit 188 to conduit 40. Each port 172 and 174 is normally in communication with the same pair of variable volume chambers as its associated conduit 38 and 40 respectively. At the end of an oscillation of rotor 26, however, either port 172 or 174 is overtravelled by vane 28 or vane 30 as rotor 26 completes it rotation and the overtravelled port will communicate with a different pair of variable volume chambers than its associated conduit 38 or 40 to function as an exhaust port for such different pair of chambers.

Thus, in operation, pressure relief valves 180 and 186 are set to operate at pressures lower than the pressure to be applied through conduits 38 and 40. For example, when air pressure is applied to conduit 38 rotor 26 is caused to rotate clockwise such that vane 30 moves toward shoe 36. The pair of subchambers defined between vane 30 and shoe 36 and between vane 28 and shoe 34 decreases in volume, and conduit 40, to which no pressure is applied, acts as an exhaust port for fluid displaced by the decreasing volume of this pair of subchambers. Valve 186 does not operate until vane 30 passes port 174 thereby placing port 174 in communication with the same pair of subchambers with which conduit 38 communicates. Valve 186 thereupon operates venting the pair of subchambers pressured through conduit 38 into conduit 40.

Similarly, when pressure is applied to conduit 40, valve 180 initially will not operate until vane 28 passes port 172 thereby placing port 172 in communication with the same pair of chambers with which conduit 40 communicates. Valve 180 then operates venting the pressurized chambers through conduit 38.

An alternative arrangement of the exhaust port connections is shown in the fluid motor of FIG. 4. In this instance, conduits 38 and 40 each constantly communicates with one subchamber of part A, their positions being adjacent shoes 34 and 36 respectively. Vane 30 is centrally provided with a pair of ports 46 and 48 displaced from each other, each port extends through vane 30 from one side to the other communicating the two subchambers of part B. Port 46 is provided with a valving device including a valve head 50 seated over port 46 on the side of vane 30 facing shoe 36 and a valve rod 52 extending through and terminating beyond port 46 in a follower 54. A coil spring 56 is disposed intermediate follower 54 and the side of vane 30 facing shoe 34 for biasing valve head 50 to remain closed over port 46. Similarly, port 48 is provided with a valving device including a valve head 58 seated over port 48 on the side of vane 30 facing shoe 34 and a valve stem 60 extending through and terminating beyond port 48 in a follower 62. A coil spring 64 is disposed intermediate follower 62 and the side of vane 30 facing shoe 34 for biasing the valve head 58 to remain closed over port 48.

In operation actuator 10 of FIG. 4 is used with a pneumatic or hydraulic circuit, as will be more fully described below. Fluid pressure delivered through conduit 40, for example, enters the variable volume subchamber defined by vane 28 and shoe 36 and, through crossover port 42 into the variable volume subchamber defined by vane 30 and shoe 34 causing rotor 26 to rotate clockwise until follower 62 strikes shoe 36. Shoe 36 is provided with a raised surface 92 located to provide a flat surface of impact for follower 62. A similar raised surface 94 is provided on shoe 34. Continued movement of rotor 26 then causes valve head 58 to lift off port 48 exhausting the variable volume subchambers of part B, through crossover port 44, the variable volume subchamber defined by vane 28 and shoe 34 and conduit 38.

It will be seen then that all subchambers of actuator 10 are thus serially connected between conduits 40 and 38. In this condition fluid can pass through the actuator and sweep it clean of any accumulated foreign material. Coil spring 56 should be under weak tension sufficient to close valve head 50 only after rotor 26 has been rotated counter-clockwise by pressuring conduit 38. It will be obvious that the operation in the reverse direction is comparable.

The external configuration of actuator 10 can be seen in FIG. 3. Housing 24 includes a pair of flanged heads 64 and 66 which have substantially flat interior surfaces 73, 75 confronting each other in parallel planes perpendicular to the axis of cylindrical side wall 32. Flanged head 64 has a central aperture 68 which acts as a journal for bearing 70 through which shaft 20 extends. The other end of shaft 20 is similarly supported in a bearing and journal 72 in the center of flanged head 66. Flanged head 64 is held in place by a series of bolts 65 which are received in tapped recesses 67 in the end of body 24. Actuator 10 is kept fluid tight by a head seal 74 between body 24 and flanged head 64, a bearing seal 76 and shaft seal 77 on either side of bearing 70 and a rotor seal 77 between bearing 70 and hub 25. End piece 66 is similarly secured and sealed to body 24.

Body 24 further includes provision for lifting in the form of a tapped boring 78 into which a lifting lug may be threadedly engaged. Foot pieces 80 and 81 on either side of the actuator base contain tapped borings 83 in the bottom thereof, and are provided for mounting actuator 10 on a wall or similar structure. As can be seen in FIG. 3, stop 36 and vane 30 include fluid seals 82 and 84 which extend all along their exposed edges. Stop 34 and vane 28 include similar seals. Flanged head 64 is further held in proper orientation by dowels 86 and 87 which extend vertically from the tops of body 24 and stops 34 and 36 into borings in the under side of flanged head 64. Shaft 20 includes suitable keys 88 and 90 for retaining a coupling thereon.

A pneumatic control system for operating the actuators of my invention is shown in FIG. 1 and includes a four-way valve 200 mounted on a suitable control panel located above deck or at some other convenient spot. Valve 200 is provided with four ports 201, 202, 203 and 204, disposed at 90° angles about a rotatable cock 205 containing two separate curved bores 206 and 207. Bores 206 and 207 are so disposed that their openings from the side of cock 205 are at 90° intervals about cock 205 which is also provided with a crank 208 permitting cock 205 to be rotated between a first position (shown in the drawings) in which the openings of bore 206 register with ports 201 and 202, connecting these, and a second position in which the openings of bore 206 register with ports 202 and 203, connecting these. Similarly, the openings from bore 207, in the first position (shown in the drawings), of cock 205 register with ports 203 and 204, and in the second position of cock 205 register with ports 201 and 204.

A connection 209 from the tank vessel compressed air supply is made to port 202 of valve 200 through a pressure reducing valve 210. An exhaust connection 211, which may include a stop cock 212 is made to port 204 of valve 200. A whistle or other sounding device can be employed to indicate a venting condition of exhaust connection 211. Conduit 40 is connected to port 201 of valve 200 and leads to and is connected to actuator 10 as described above. Conduit 38 is connected to port 203 and similarly leads to and is connected to actuator 10. Each of conduits 38 and 40 is provided with a pressure gauge 215, 216, respectively at or near the control panel at which valve 200 is located.

In operation, assuming rotor 26 is in a position at the limit of its clockwise rotation, i.e., with vane 28 adjacent stop 34, assuming that the corresponding position of valve 17 is a closed position of such valve, assuming that pressure reducing valve 210 is set to reduce the compressed air pressure at port 202 to a valve somewhat in excess of the operating perssure required to cause rotation of rotor 26 and assuming that crank 208 is in its second position, valve 17 is opened by rotating crank 208 to its first position, shown in FIG. 1, thus throwing pressure on conduit 40 and relieving pressure on conduit 38 by connecting conduit 38 to exhaust fitting 211. The compressed air thus is introduced to the subchamber defined by vane 30 and shoe 36 (FIG. 2) from which it passes through crossover port 44 to the subchamber defined by vane 28 and shoe 34 rotating rotor 26 counterclockwise which rotates valve 17 from its closed to open position.

As vane 28 approaches shoe 36 it passes port 172 which then communicates with the subchamber defined by vane 28 and shoe 34 allowing the pressuring air to vent through conduit 38. The hissing of the venting air or operation of any device utilized to indicate the venting condition assures the operator that the valve is opened.

It will be apparent that valve 17 is closed by the reverse operation, that is throwing crank 208 to the second position, placing pressure on conduit 38 and exhausting conduit 40. Rotor 26 thereupon rotates clockwise and at the end of its travel passes port 174 thereby venting the interior of actuator 10 through conduit 40.

It will be noted that where, as illustrated with reference to FIG. 1, actuator 10 is submerged in liquid, a leak into the actuator will not materially effect the operation of the system because of the scavenging of cylinder 10 by the pressuring fluid at the end of each rotation. The operator, moreover, will be advised of such leak by the venting discharge of conduit 211 at the control panel.

The control system described in FIG. 1 can readily be modified to accommodate a closed hydraulic system. Thus, for example, referring to FIG. 4, the system of FIG. 1 is so modified by connecting supply line 209 to the outlet side of an accumulator 280, the inlet side of which is connected by a conduit 281 to the discharge side of an air operated hydraulic pump 282. Pump 282 includes an air inlet connection 290, inlet valve 291, filter 292 and an air discharge fitting not shown. Exhaust fitting 211 from four-way valve 200 is connected through stop cock 212 and a conduit 283 to discharge into a sump tank 284, the drain of which is connected to a conduit 285 leading to the suction side of pump 282. Operation is similar to that described with respect to FIG. 1 except that the system is closed and operated with a hydraulic fluid rather than compressed air. Since actuator 10 is self-scavenging only simply measures are necessary to clarify the hydraulic fluid.

In a typical valve 17, such as is used in a conventional tank vessel, about a 900 pounds thrust is required to operate the valve. This can be accomplished using an actuator with 9 square inches of surface area per vane operated at 100 pounds per square inch pressure. These requirements are met using typical compressed air supply available on a tank vessel or by relatively simple low pressure hydraulic units.

Although I have shown actuators built according to my invention having four variable volume subchambers it will be obvious that actuators according to my invention can be built with a greater even number of subchambers without changing the basic nature of the actuator. Further it will be obvious that the angle through which the actuator operates can be varied substantially. For example, the width of stops 34 and 36 can be increased thereby reducing the angle of operation of rotor 26. It will, of course, be understood that the control systems of FIGS. 1 and 4 are each useful with the actuator constructions of FIGS. 2 and 3.

The actuators as described above are suitable for operation with valves which do not require positive locking arrangements to maintain them in the fully opened or fully closed position. It will be apparent, however, that the actuators described can be easily modified or they can be used in conjunction with locking devices externally applied where locking is required.

I claim:

In a vane type fluid actuated motor including means defining end pieces having internal confronting surfaces disposed in substantially parallel planes; side wall means disposed between and interconnecting said end pieces and having an internal cylindrical surface with its axis normal to the planes of said end pieces; a rotor located intermediate said end pieces rotatable between a first and second position about an axis coincident with the axis of said side wall means, said rotor including a hub portion in sliding sealing contact with said end pieces; said hub, together with said side wall means and said end pieces defining an annular chamber, first and second diametrically positioned internal wall means disposed between and interconnecting said end pieces and attached to and inwardly extending from said side wall means the inner end of each internal wall means being in sliding sealing contact with said rotor thereby dividing said annular chamber into first and second parti-annular chambers accurately displaced from each other, a first vane attached to said hub extending between and normal to the planes of said internal surfaces of said end pieces into said first parti-annular chamber in sliding sealing contact with said end pieces and side wall means and rotatable with said rotor between the first position thereof with said first vane adjacent said first internal wall means and the second position thereof with said first vane adjacent said second internal wall means, thereby dividing said first parti-annular chamber into first and second enclosed variable volume subchambers said first subchamber having its maximum and minimum volume at the first and second position respectively of said rotor and said second subchamber having its maximum and minimum volume at the second and first position respectively of said rotor; a second vane attached to said hub extending between and normal to the planes of said internal surfaces of said end pieces into said second parti-annular chamber in sliding sealing contact with said end pieces and side wall means rotatable with said rotor between the first position thereof with said second vane adjacent said second internal wall means and said second position thereof with said second vane adjacent said first internal wall means thereby dividing said second parti-annular chamber into third and fourth enclosed variable volume subchambers, said third subchamber having its maximum and minimum volumes at the first and second positions respectively of said rotor and the said fourth subchamber having its maximum and minimum volumes at the second and first positions respectively of said rotor; fluid conduit means intercommunicating said first and third subchambers; fluid conduit means intercommunicating said second and fourth subchambers; first fluid inlet means in communication with one of said first and third subchambers; second fluid inlet means in communication with one of said second and fourth subchambers; the improvement which includes first exhaust port means intercommunicating the other of said first and third subchambers with said second fluid inlet means at said first position of said rotor and second exhaust port means intercommunicating the other of said second and fourth subchambers with said first fluid inlet means at the second position of said rotor.

References Cited
UNITED STATES PATENTS

| | | | |
|---|---|---|---|
| 2,966,144 | 12/1960 | Self | 92—122 |
| 3,110,228 | 11/1963 | Shramo et al. | 91—400 X |
| 3,208,469 | 9/1965 | Gravert | 91—401 |

MARTIN P. SCHWADRON, *Primary Examiner.*

I. C. COHEN, *Assistant Examiner.*